United States Patent [19]

Hohmann et al.

[11] Patent Number: 4,525,025
[45] Date of Patent: Jun. 25, 1985

[54] FIBER OPTIC ROTARY JOINT USING A REFLECTIVE SURFACE AND TANGENTIALLY MOUNTED ROTOR AND STATOR OPTICAL FIBERS

[75] Inventors: Thomas C. Hohmann, Blacksburg; Norris E. Lewis, Christiansburg; Michael B. Miller, Blacksburg, all of Va.

[73] Assignee: Litton Systems Inc., Blacksburg, Va.

[21] Appl. No.: 477,070

[22] Filed: Mar. 21, 1983

[51] Int. Cl.³ .............................. G02B 5/14; G02B 7/26
[52] U.S. Cl. ............................... 350/96.15; 350/96.20
[58] Field of Search ................ 350/96.15, 96.20, 96.21

[56] References Cited
U.S. PATENT DOCUMENTS

| | | | |
|---|---|---|---|
| 4,249,794 | 2/1981 | Haley | 350/96.20 |
| 4,277,134 | 7/1981 | Upton, Jr. | 350/96.20 |
| 4,436,367 | 3/1984 | Lewis et al. | 350/96.20 |
| 4,456,903 | 6/1984 | Kishi et al. | 350/96.20 |
| 4,492,427 | 1/1985 | Lewis et al. | 350/96.20 |

*Primary Examiner*—William L. Sikes
*Assistant Examiner*—Frank González
*Attorney, Agent, or Firm*—Brian L. Ribando

[57] ABSTRACT

A fiber optic rotary joint which couples an optical signal across a rotary interface includes an annular reflective wall formed on a stator and an optic fiber mounted on the stator having one end in close proximity to the annular reflective wall. A rotor includes a rotor optic fiber which has one end positioned in close proximity and tangential to the annular reflective wall. A signal emitted by one of the optic fibers will be reflected in short chordal paths along the annular reflective wall and received by the other of the optic fibers.

11 Claims, 13 Drawing Figures

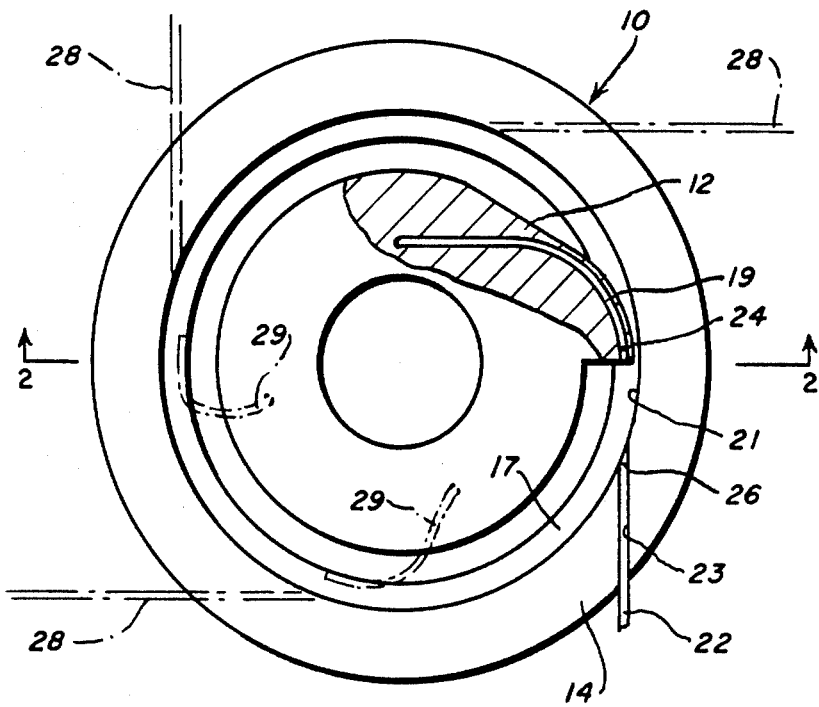
Fig_1
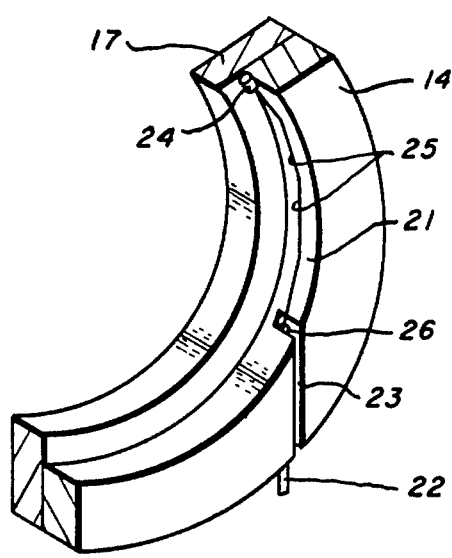
Fig_2
Fig_1A

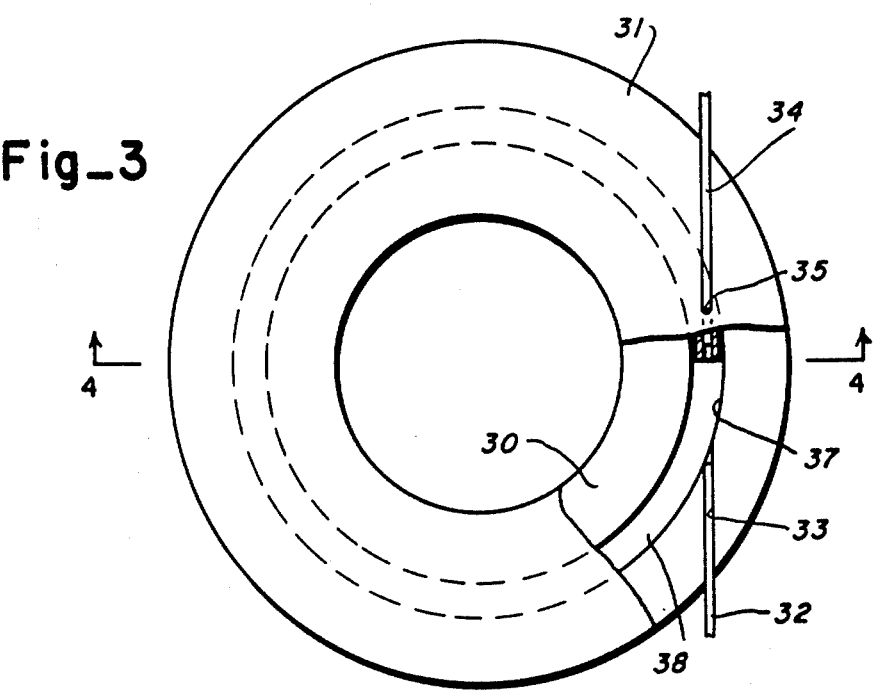
Fig_3
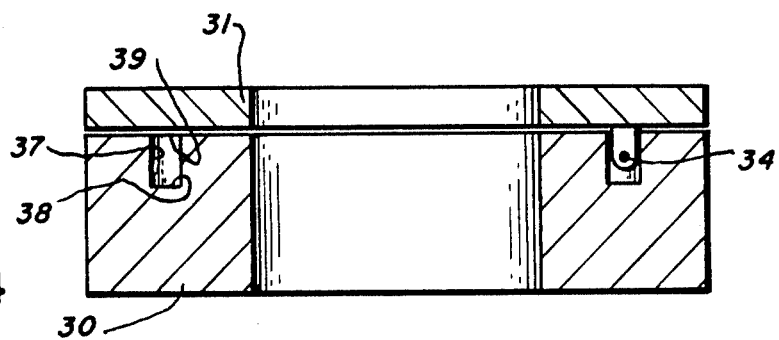
Fig_4
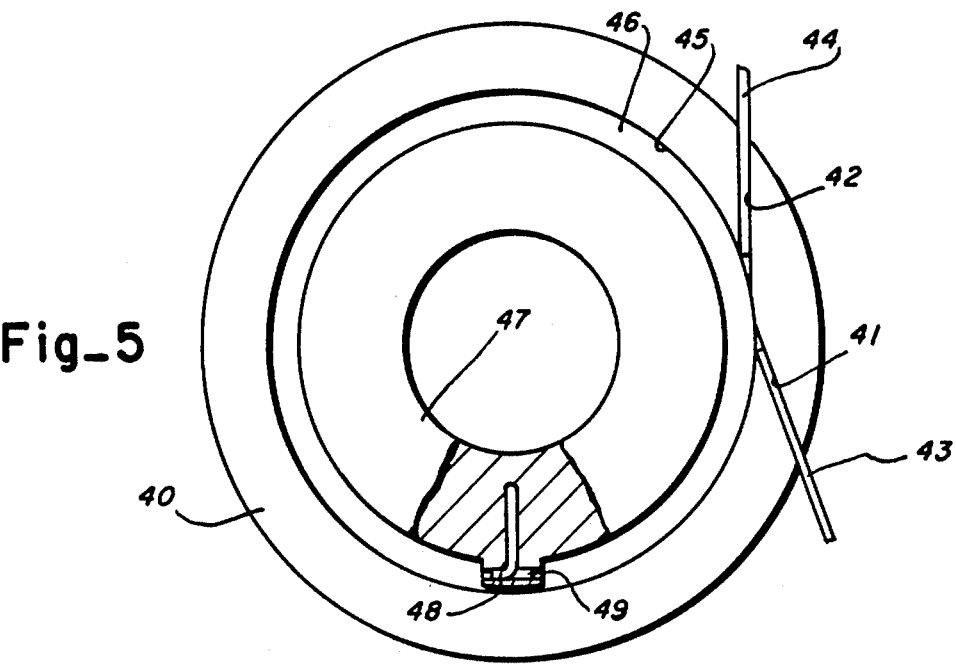
Fig_5

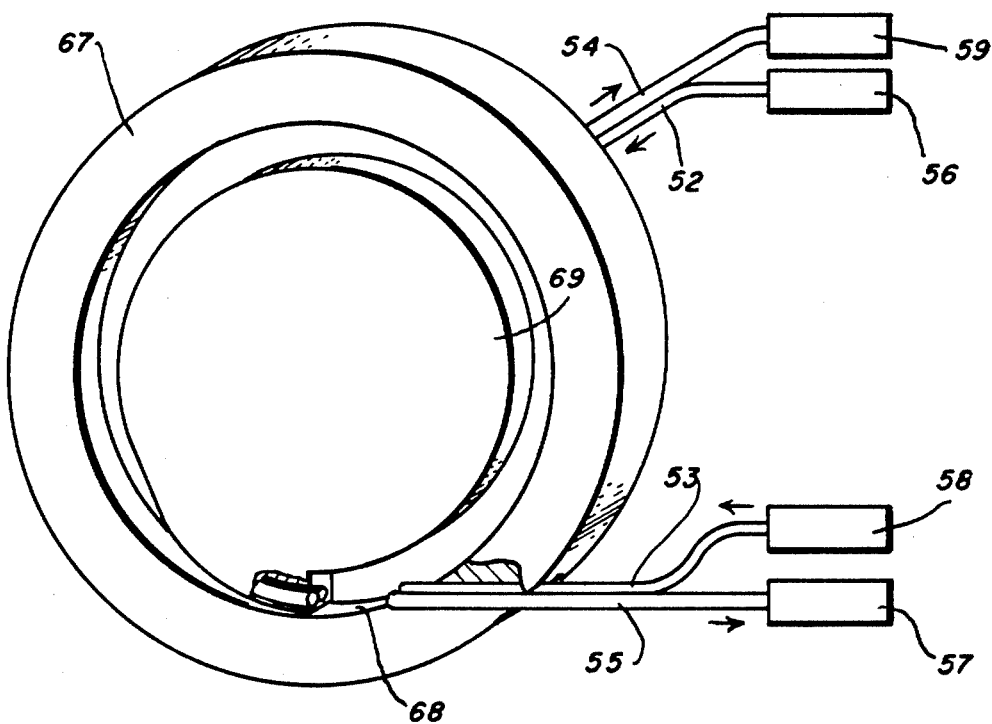
Fig_6
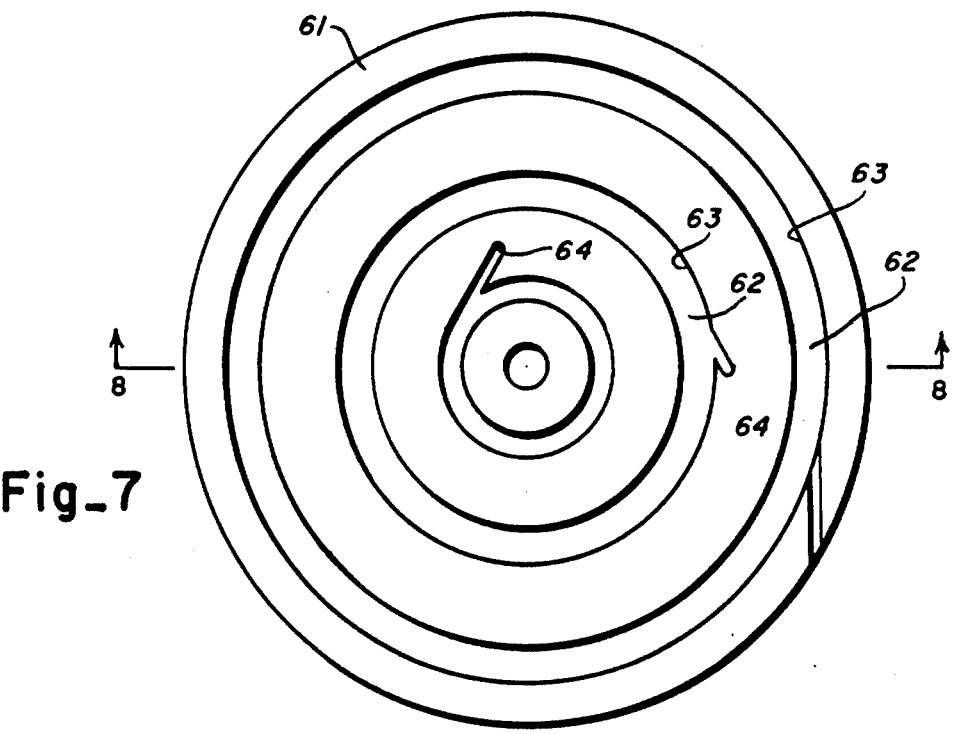
Fig_7
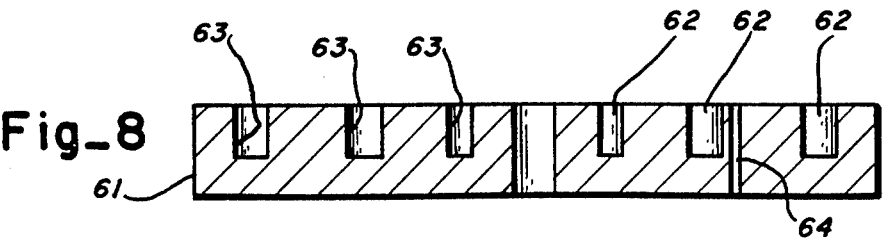
Fig_8

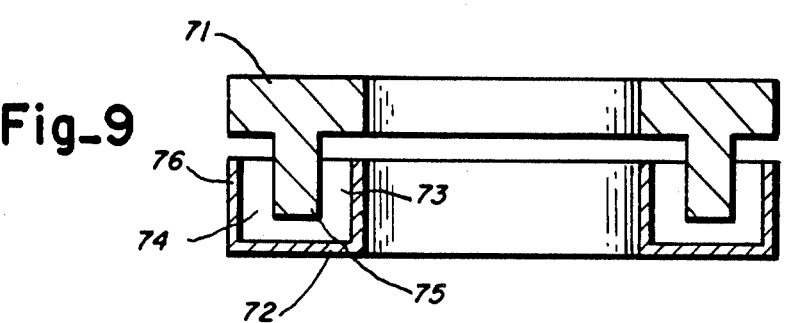
Fig_9
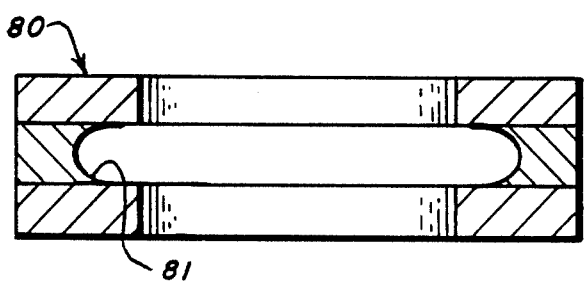
Fig_10
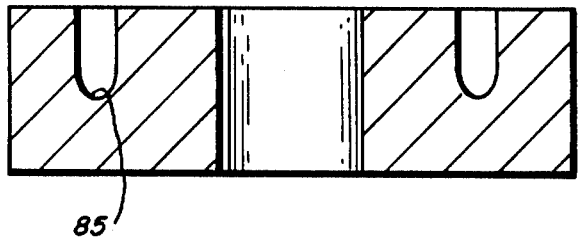
Fig_11
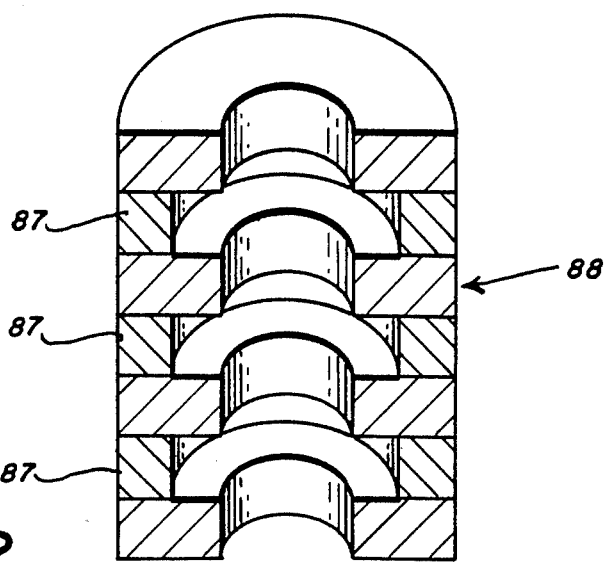
Fig_12

FIBER OPTIC ROTARY JOINT USING A REFLECTIVE SURFACE AND TANGENTIALLY MOUNTED ROTOR AND STATOR OPTICAL FIBERS

BACKGROUND OF THE INVENTION

The invention relates to a fiber optic rotary joint which utilizes reflections of light along the inside surface of an annular reflector.

Fiber optic rotary joints which comprise two fibers held end to end and mounted for rotation relative to one another are well known in the art. Such "on-axis" construction only allows for one optical channel, however, and in many instances, a single channel is not sufficient. In order to provide for plural channel optical slip rings, several "off-axis" constructions have been utilized. These constructions involve plural transmitting or receiving fibers which are swept around the circumference of the rotary joint to intercept optic signals along successive radial paths. Such constructions are difficult and time consuming to make and require a large number of optic fibers, especially when the slip ring diameter is large. There is, therefore, a need for a fiber optic rotary joint which will allow off axis mounting of the optic cables, but which will be simple in construction and will not require a large number of optic fibers.

SUMMARY AND OBJECTS OF THE INVENTION

According to the invention, light from a first optic fiber is projected against the inside surface of a cylinder which has been polished to make it highly reflective. The light will be reflected along the surface and can be collected by a suitably placed receiving optical fiber. The amount of light coupled from the first fiber into the second fiber can be maximized in three ways. First, the fiber should inject the light as nearly tangentially to the reflective surface as possible. Secondly, the receiving fiber should be placed tangentially to the reflective surface without touching it. Finally, reflective sidewalls should be provided on either side of the concave reflective surface. These sidewalls together with the annular reflective surface form a reflective channel in which the light is effectively trapped until it is intercepted and carried away by the collector fiber.

In order to use such constructions to produce a rotating optical signal transmitting device, the source fiber and collector fiber must be mounted on concentric rings or shafts with the outer ring forming the annular reflective surface.

Since the optical density of the transmitted signal in the reflective channel decreases with distance from the source fiber, signal strength will decrease as the collector fiber moves away from the source fiber. To minimize this effect, several collector fibers can be spaced equally around the rotor so that as one collector moves into an area of lower optical signal density (away from the source fiber) another collector moves into an area of higher optical density (adjacent to the source fiber). The number and spacing of the collector fibers is determined by the diameter of the reflective channel and by the amount of signal variation which can be tolerated. Conversely, a plurality of source fibers may be used with a single or with plural collector fibers.

Since a fiber optic rotary joint of this type relies on the reflections from an annular surface, condensation on the surface during periods of high relative humidity and cool temperatures will seriously impair performance. This problem can be overcome by implanting a heating device such as a section of nichrome wire in the annular ring near the reflective area. Heat generated by the wire will raise the temperature of the reflective surface to thereby prevent condensation. Alternatively, the device may be sealed and filled with an optical index matching fluid to prevent condensation.

It is therefore an object of the present invention to provide a fiber optic rotary joint which utilizes the inside surface of an annular reflector.

It is another object of the invention to provide a plural channel fiber optic rotary joint which utilizes the annular reflective surface of one or more cylindrical channels.

It is further an object of the invention to provide a fiber optic rotary joint in which the formation of condensation on the reflective surface thereof is prevented by the use of heating wire.

These and other objects of the invention will become apparent from the following detailed description taken in conjunction with the accompanying drawing figures in which like reference numerals designate like or corresponding parts throughout the figures.

BRIEF DESCRIPTION OF THE DRAWINGS

FIG. 1 is a top view in section of a fiber optic rotary joint according to the invention.

FIG. 1A is a perspective view of the stator of the fiber optic rotary joint of FIG. 1.

FIG. 2 is a sectional view taken along line 2—2 of FIG. 1.

FIG. 3 is a top view partly in section of an alternate form of a fiber optic rotary joint of FIG. 1.

FIG. 4 is a sectional view taken along line 4—4 of FIG. 3.

FIG. 5 is a top view, partly in section, of another form of a fiber optic rotary joint adapted for the transmission of two separate channels of information.

FIG. 6 is a perspective view, partly in section, of a fiber optic rotary joint in which differently sized transmitting and receiving optical fibers are used.

FIG. 7 is a top view of a fiber optic rotary joint providing for a plurality of concentric optical channels.

FIG. 8 is a sectional view taken along line 8—8 of FIG. 7.

FIG. 9 is a sectional view of another form of a fiber optic rotary joint.

FIGS. 10 and 11 show alternate constructions of the annular reflector in a fiber optic rotary joint.

FIG. 12 shows a stack of a plurality of fiber optic rotary joints.

DESCRIPTION OF THE PREFERRED EMBODIMENT

Referring now to the drawings, there is shown in FIGS. 1 and 2 a fiber optic rotary joint generally indicated by the reference numeral 10. The rotary joint comprises a rotor 12 mounted within a stator 13. The stator comprises a center ring 14 and top and bottom rings 16 and 17. A rotor optic fiber 19 is mounted on the rotor 12. A stator optic fiber 22 is positioned in a groove 23 formed in the stator ring 14.

An annular reflective surface 21 is formed by the inner surface of the center ring 14 and the end 24 of the rotor optic cable 19 is positioned so as to be closely adjacent and tangential thereto. The end 26 of the stator optic fiber 22 is positioned by the slot 23 so as to be closely adjacent and tangential to the annular reflective surface 21. As best shown in FIG. 1A, light rays emitted from the end 24 of the rotor optic fiber 19 impinge on and are deflected by the reflective annular surface 21 and propagate along the surface 21 in short chordal paths 25 until being intercepted by the fiber end 26 of the stator fiber 22. In order to prevent the formation of condensation on the reflective surface 21, a nichrome wire 27 embedded in the center ring 14 may be heated by passing current therethrough. In an alternative embodiment with the addition of appropriate seals (not shown), the space between the rotor 12 and the stator 13 may be filled with an index-matching fluid in order to prevent condensation on the reflective surface 21.

It has been found that both the rotor and the stator optic fiber may be used interchangeably as the optic signal source or collector. The optic fibers which are used may be either single strand or multiple strand as desired. Equivalent results may also be obtained if the rotor and stator are interchanged; i.e., referring to FIG. 1, the inner ring may be a stator and the outer ring may be the rotor. If the diameter of the rotary joint 10 is large, it may be desirable to provide a plurality of additional stator fibers 28 around the circumference of the stator 13 to shorten the path length around the reflective annular surface 21 between the rotor optic cable 19 and the nearest of the stator fiber ends. Alternatively, it may be desirable to provide a plurality of additional rotor fibers 29.

Turning now to FIGS. 3 and 4, an alternate embodiment is shown wherein the stator comprises a grooved annular ring 30 and the rotor comprises a flat washer-like member 31. The stator optic fiber 32 is positioned in the stator ring 30 by means of a slot 33 and the rotor fiber 34 is positioned in the rotor 31 by means of an aperture 35. As in the embodiment of FIGS. 3 and 4, the ends of the rotor and stator optic fibers are positioned closely adjacent and tangential to the annular reflective surface 37 formed in the stator ring 30. The reflective surface 37 is bounded by the adjacent surface 38 of the stator and the undersurface 39 of the rotor. All three surfaces 37, 38, and 39 are reflective and form a channel along which optic signals easily propagate.

Turning now to FIG. 5, a further embodiment is shown wherein the number of optical paths in the rotary optic joint is doubled. As shown, a stator ring 40 includes two slots 41 and 42 each of which positions an optic fiber 43 and 44 adjacent and tangential to an annular reflective surface 45 formed by a groove 46. The optic fiber 43 is positioned to inject an optic signal into the ring 40 which propagates along the annular surface 45 in a counterclockwise direction while the optic fiber 44 injects a signal which propagates around the annular surface 45 in a clockwise direction. The rotor 47 which is used with the stator 40 positions two optic fibers 48 and 49 adjacent the reflective surface 45 with their ends oriented in opposite directions. The optic cable 48 collects signals travelling around the surface 45 in a counterclockwise direction, i.e. those signals emitted from fiber 43, while the optic fiber 49 collects signals travelling in a clockwise direction, i.e. those emitted from cable 44.

Turning now to FIG. 6, a rotary optic joint having duplex operation is shown. This configuration embodies the principle that the optic fiber which emits a signal may be very small while the optic fiber which collects the signal should advantageously be large. Accordingly, a fiber optic rotary joint comprises a stator 67, an annular reflective surface 68, a rotary 69, small transmitting fibers 52 and 53, and large receiving fibers 54 and 55. An optical signal transmitter 56 is coupled to the input end of the small fiber 52 which injects a signal onto the reflective surface 68 to be received or collected by the large fiber 55 and conducted to an optical signal receiver 57. A second optical signal transmitter 58 is coupled to the input end of the small fiber 53 which injects a signal onto the surface 68 to be collected by the optic fiber 54 and the optical signal receiver 59. The signals from the transmitters 56 and 58 are injected onto the annular surface 68 in the opposite directions and the directionality of the signal along the surface 68 insures that a signal introduced by cable 52 will not be received by cable 54 and receiver 59. It will further be appreciated that any signal emanating from cable 52 which is intercepted by cable 53 will not be received in the sense that a transmitter such as the transmitter 58 cannot "receive" a signal.

Turning now to FIGS. 7 and 8, a modification of the groove configuration in the optic rotary joint is shown whereby the number of channels along a radial line may be increased to any desired number. In particular, FIG. 7 shows a rotary optic joint comprising a stator 61 which comprises three concentric cavities 62 into which signals may be introduced. As in the previous embodiment, each cavity 62 comprises an annular reflective surface 63 along which an injected optic signal will propagate. Access apertures 64 are provided for each of the cavities 62 so that the end of an optic fiber may be positioned therein. It will be understood that a cover plate similar to that shown in FIG. 4 will be provided to complete the optic cavity and that mounting apertures will be provided in the cover plate for mounting the ends of optic fibers therein.

Turning now to FIG. 9, an alternate construction is shown in which the fiber optic rotor comprises a T-shaped member 71 and the stator comprises a U-shaped member 72. These two members interact with one another to create two optic channels 73 and 74 with the annular reflecting surface of the channel 73 formed by the upright portion 75 of the T-shaped member 71 and the annular reflecting surface of the channel 74 formed by the outer wall 76 of the U-shaped channel 72.

Turning now to FIG. 10, there is shown a stator 80 for use in a fiber optic rotary joint in which the annular reflective surface 81 has the cross-sectional shape of an ellipse. This particular shape provides an optic waveguide channel without sharp corners and has been found to give particularly good results.

FIG. 11 shows an alternative embodiment in which the annular channel 85 is U-shaped in cross-section.

FIG. 12 shows a construction in which a plurality of fiber optic rotary joints 87 may be aligned along a common axis to form a stack 88 to provide a plurality of channels.

It will be apparent to those skilled in the art that a rotor optic fiber and a stator optic fiber must be included with the rotor and stator construction of FIGS. 9-12 in order to provide an operative fiber optic rotary joint. Further, any of the configurations shown in FIGS. 1-10 may be arranged in a stack as shown in FIG. 12 to produce rotary optic joints having greater total information channel capacities.

Having thus described the invention, various modifications and alterations will occur to those skilled in the art, which modifications and alterations are intended to be within the scope of the present invention as defined in the appended claims.

What is claimed is:

1. A fiber optic rotary joint for coupling an optical signal across a rotary interface comprising:
   a stator,
   an annular reflective wall formed on said stator,
   a stator optic fiber mounted on said stator and having an end in close proximity and tangential to said annular reflective wall,
   a rotor,
   a rotor optic fiber,
   means on said rotor for positioning an end of said rotor optic fiber in close proximity and tangential to said annular reflective wall, whereby a signal emitted by one of said optic fibers will be projected tangentially against and reflected in short chordal paths along said annular reflective wall to be received by the other of said optic fibers.

2. The fiber optic rotary joint of claim 1 further comprising:
   reflective side walls on either side of and in close proximity to said annular reflective wall, said reflective side walls together with said annular reflective wall forming an annular three sided channel in which said end of said rotor optic fiber is located.

3. The fiber optic rotary joint of claim 1 further comprising:
   a pluraity of optic fibers mounted on said stator, said optic fibers being spaced around the circumference of said annular reflective wall.

4. The fiber optic rotary joint of claim 1 further comprising:
   a heating wire embedded in said stator in proximity to said annular reflective wall, said heating wire preventing the formation of condensation on said annular reflective wall.

5. The fiber optic rotary joint of claim 1, wherein said stator has the cross-sectional shape of a U and said rotor has the cross-sectional shape of a T.

6. A fiber optic rotary joint for coupling an optical signal across a rotary interface comprising:
   a stator,
   a groove in said stator,
   an annular reflective wall formed by said groove,
   reflective side walls on either side of said annular reflective wall, said reflective side walls together with said annular reflective wall forming an annular three sided channel,
   a stator optic fiber mounted on said stator and having an end in close proximity and tangential to said annular reflective wall,
   a rotor,
   a rotor optic fiber,
   means on said rotor for positioning an end of said rotor within said three sided channel and in close proximity and tangential to said annular reflective wall, whereby a signal emitted by one of said optic fibers will be projected tangentially against and reflected in short chordal paths along said annular reflective wall to be received by the other of said optic fibers.

7. The fiber optic rotary joint in claim 6 further comprising:
   a second rotor optic fiber, wherein said first rotor optic fiber faces in a clockwise direction around said channel and said second rotary optic fiber faces in a counterclockwise direction around said channel, and
   a second stator optic fiber, wherein said first stator optic fiber receives signals from said first rotor optic fiber propagating in a clockwise direction around said channel, and said second stator optic fiber receives signals from said second rotor optic fiber propagating in a counterclockwise direction around said channel.

8. The fiber optic rotary joint of claim 6 further comprising:
   a second rotor optic fiber, said second rotor optic fiber being larger in diameter than said first rotor optic fiber, and
   a second stator optic fiber, said second stator optic fiber being larger in diameter than said first stator optic fiber, whereby optic signals transmitted by said first rotor optic fiber are received by said second stator optic fiber, and optic signals transmitted by said first stator optic fiber are received by said second rotor optic fiber.

9. The fiber optic rotary joint of claim 6 further comprising:
   second and third concentric grooves in said stator providing second and third annular reflective walls,
   second and third stator optic fibers mounted in said stator and respectively having second and third ends in close proximity and tangential to said second and third annular reflective walls, and
   second and third rotor optic fibers, each having an end in close proximity and tangential to said second and third annular reflective walls, whereby said fiber optic rotary device provides three concentric optic signal channels.

10. The fiber optic rotary joint of claim 6, wherein said groove has the cross-sectional shape of an ellipse.

11. A fiber optic rotary joint for coupling an optical signal across a rotary interface comprising:
    a stator,
    an annular reflective wall formed on said stator,
    a stator optic fiber mounted on said stator and having an end in close proximity and tangential to said annular reflective wall,
    a rotor,
    a plurality of rotor optic fibers,
    means on said rotor for positioning the ends of said rotor optic fibers spaced around said rotor in close proximity and tangential to said annular reflective wall, whereby a signal emitted by one of said optic fibers will be projected tangentially against and reflected in short chordal paths along said annular reflective wall to be received by the other of said optic fibers.

* * * * *